United States Patent
Shin

(10) Patent No.: US 6,931,312 B2
(45) Date of Patent: Aug. 16, 2005

(54) DETECTION APPARATUS FOR STEERING ANGLE IN VEHICLE

(75) Inventor: Seung-Bok Shin, Kyunggi-do (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 347 days.

(21) Appl. No.: 10/330,325

(22) Filed: Dec. 30, 2002

(65) Prior Publication Data

US 2004/0078166 A1 Apr. 22, 2004

(30) Foreign Application Priority Data

Oct. 18, 2002 (KR) ................................ 10-2002-0063791

(51) Int. Cl.[7] ............................. G01B 7/30; G01P 3/42; G01L 3/10
(52) U.S. Cl. ............................. 701/41; 701/1; 702/151; 702/163; 324/207.21; 73/862.333
(58) Field of Search ................................ 701/1, 41, 42, 701/84, 87; 73/862.333, 504.02, 504.03; 324/207.21, 207.25, 207.23, 244, 244.1; 702/145, 151, 133, 163; 180/443

(56) References Cited

U.S. PATENT DOCUMENTS 6,246,232 B1 * 6/2001 Okumura ................. 324/207.2
6,396,386 B2 * 5/2002 Okumura .................... 338/180

* cited by examiner

Primary Examiner—Tan Q. Nguyen

(74) Attorney, Agent, or Firm—Greenblum & Bernstein, P.L.C.

(57) ABSTRACT

Disclosed is an apparatus for detecting steering angle in vehicle, such that the size of the apparatus for detecting steering angle in vehicle using gears and magneto resistive sensors, could be reduced. An apparatus for detecting steering angle in vehicle including: a shaft gear axially combined to a steering shaft of a vehicle; a first detecting gear joined, with a first gear ratio, to the shaft gear in a tooth combining manner; a second detecting gear joined, with a second gear ratio, to the shaft gear in a tooth combining manner; a first permanent magnet installed on an axis of the first detecting gear, for generating rotational magnetic field; a first magneto resistive sensor closely installed on an upper portion of the first permanent magnet, for detecting rotational angle of the rotational magnetic field; a second permanent magnet installed on an axis of the second detecting gear, for generating rotational magnetic field; a second magneto resistive sensor closely installed on an upper portion of the second permanent magnet, for detecting rotational angle of the rotational magnetic field; and a computing/controlling means for computing rotational direction and angle of the steering shaft by processing detected signals provided from the first and the second magneto resistive sensors using a predetermined program, the apparatus is configured such that: the shaft gear is a multi-level gear having an upper level gear and a lower level gear; the first and the second detecting gears are joined to the upper level gear and the lower level gear in a tooth combining manner so that the first and the second detecting gears are partially overlapped; and a gap maintaining member for equally maintaining a gap between the second permanent magnet and the second magneto resistive sensor as much as a gap between the first permanent magnet and the first magneto resistive sensor, is further included.

2 Claims, 4 Drawing Sheets

[FIG. 1]
PRIOR ART
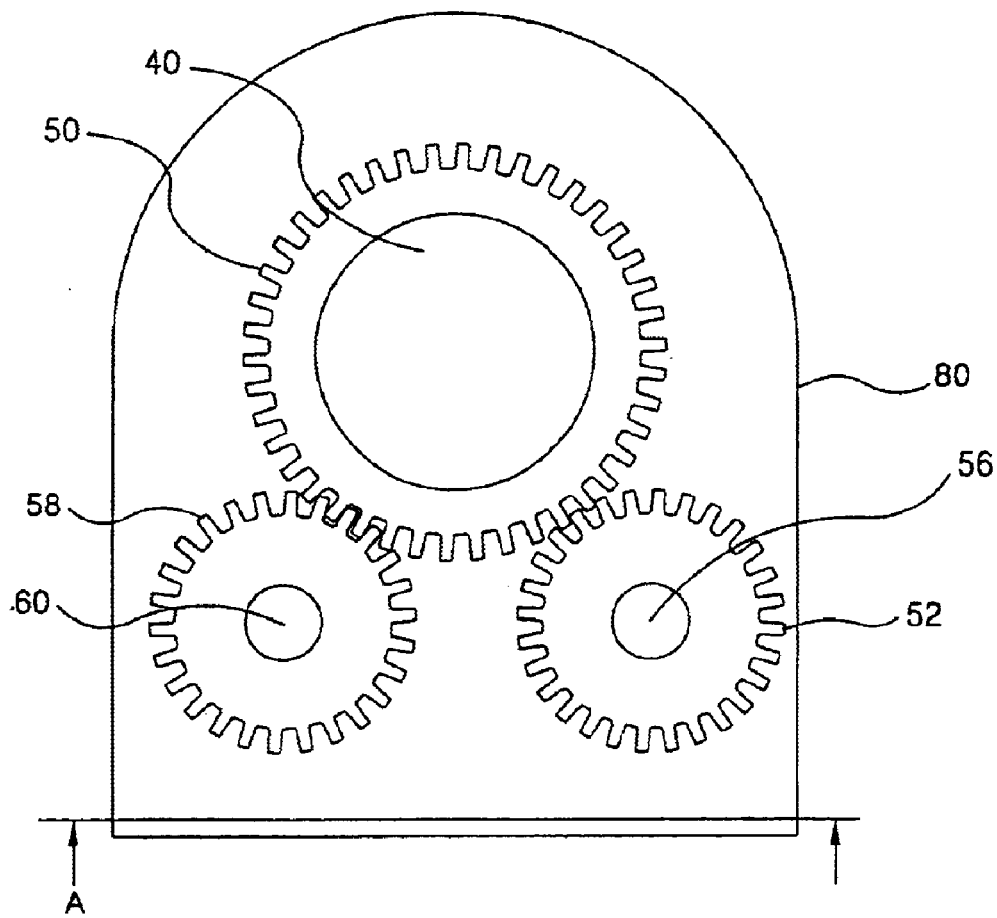
[FIG. 2]
PRIOR ART
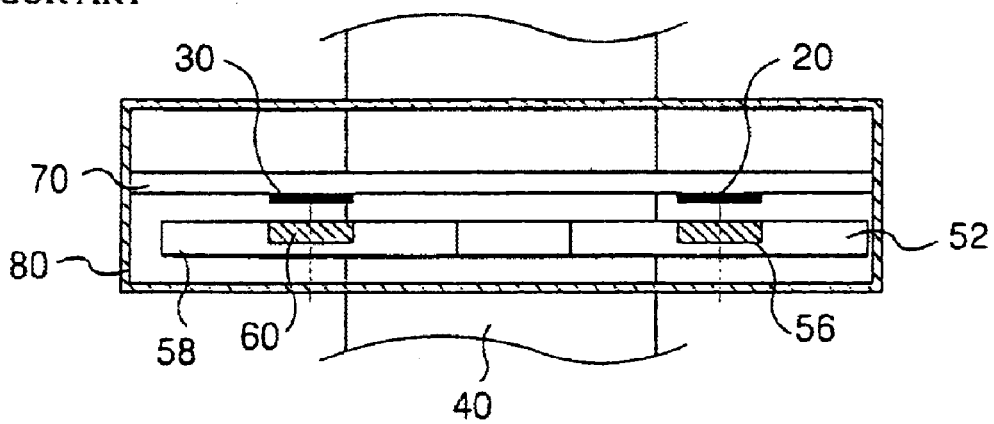

[FIG. 3]
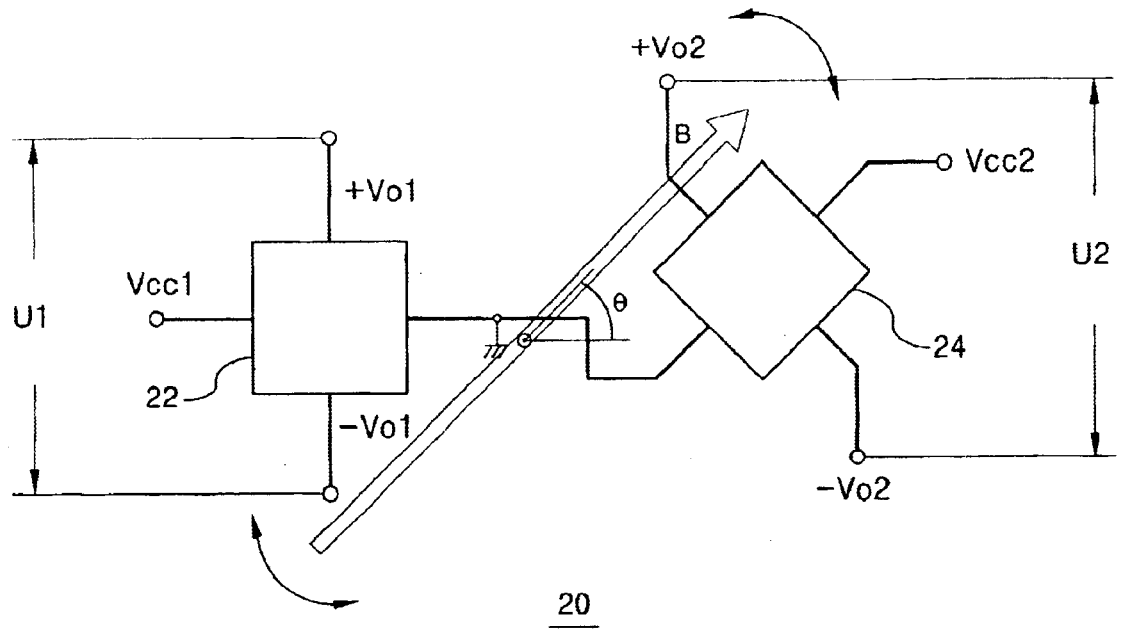
[FIG. 4]
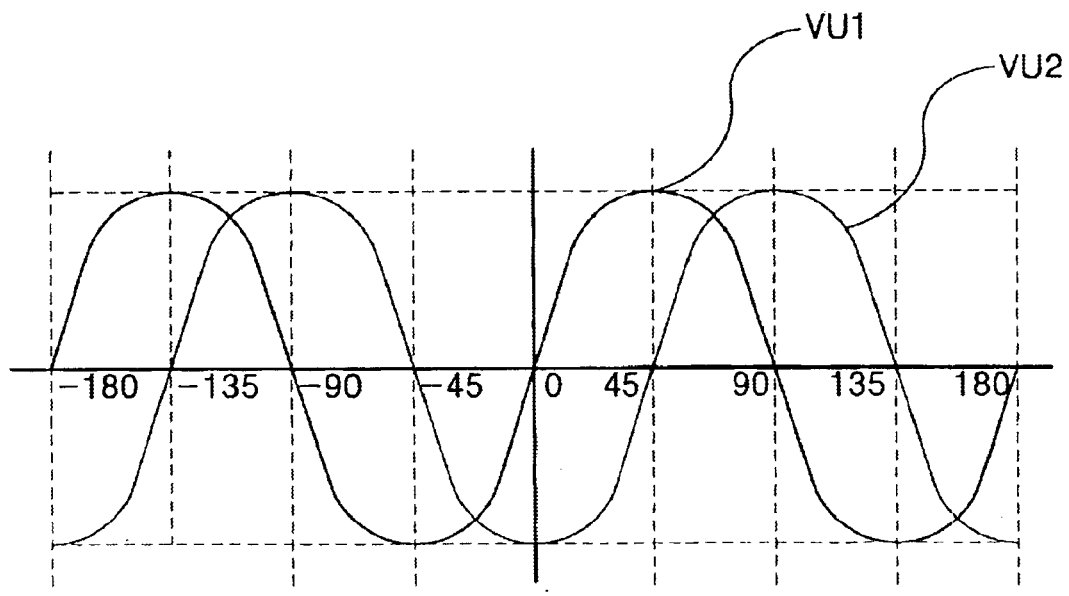

[FIG. 5]
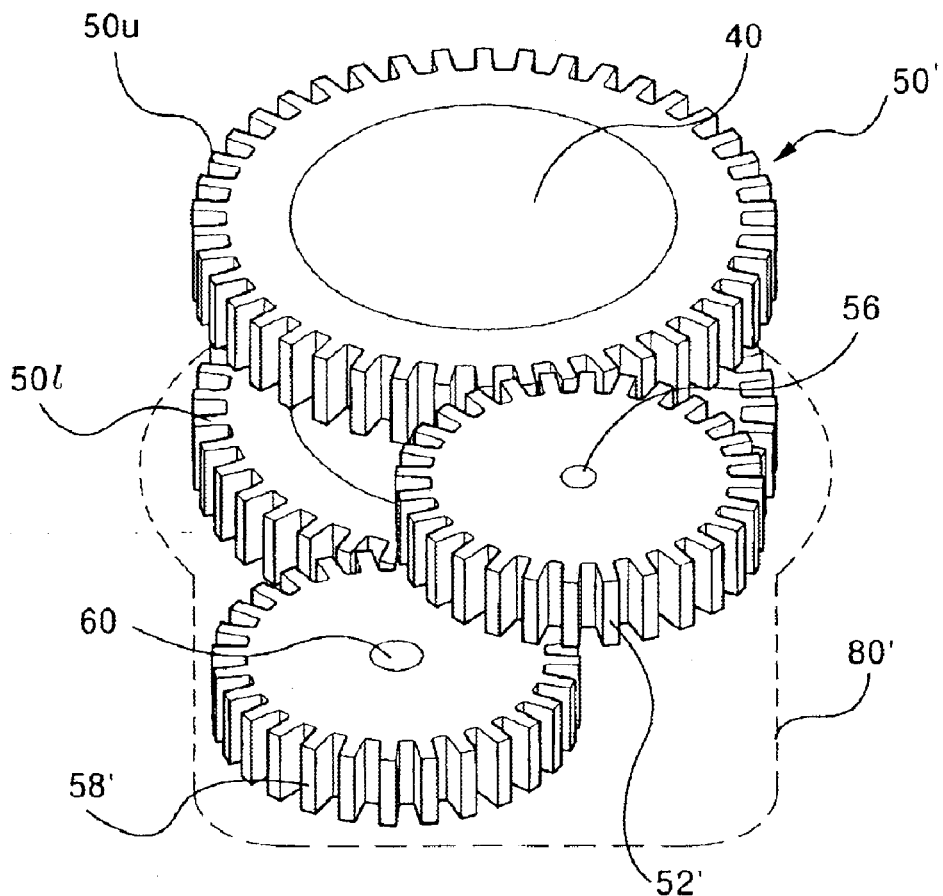
[FIG. 6]
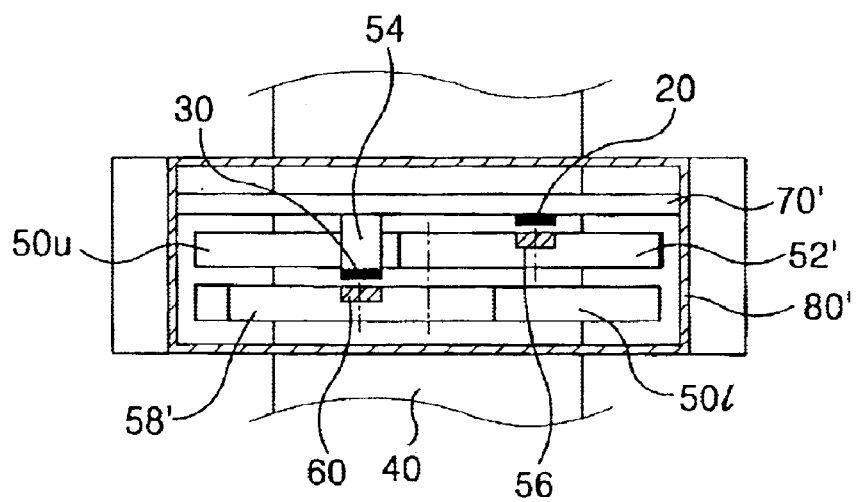

[FIG. 7]
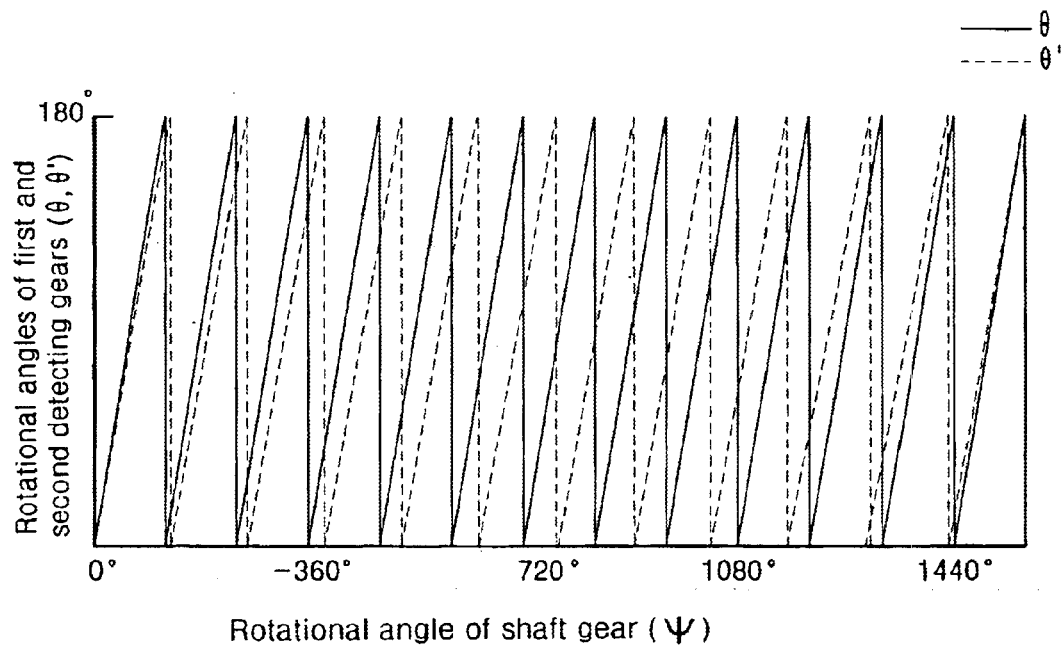
[FIG. 8]
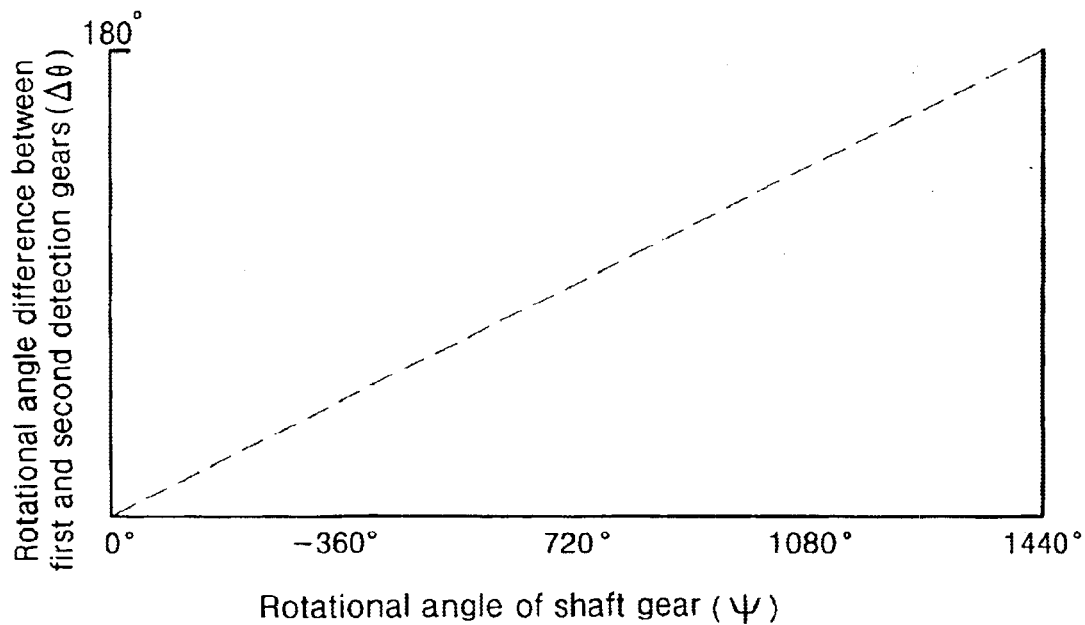

ns of magnetic fields are changed. The first and the second magneto resistive sensors 20 and 30 output detecting signals in response to such changes, and computing/controlling unit (not shown) outputs steering angle and direction by processing the detected signals using a predetermined program.

DETECTION APPARATUS FOR STEERING ANGLE IN VEHICLE

BACKGROUND OF THE INVENTION

1. Field of the Invention

The present invention relates to an apparatus for detecting steering angle in a vehicle, and particularly to an apparatus for detecting steering angle in a vehicle using a magneto resistive sensor.

2. Description of the Related Art

Variety of apparatus for detecting rotational angle of a rotating body, is introduced, and these apparatus for detecting rotational angle could be used for the apparatus for detecting steering angle in a vehicle. More specifically, the apparatus for detecting steering angle is adopted for roll suppression upon steering in controlling attenuation force of shock absorber in the vehicle.

FIG. 1 is a plan view schematically illustrating the apparatus for detecting steering angle in vehicle of the related art, and FIG. 2 is a cross-sectional view taken along line A—A in the apparatus for detecting steering angle in vehicle of the related art. As shown in FIG. 1, the mechanical construction for the apparatus for detecting steering angle in vehicle of a related art, may includes a housing 80 for receiving the apparatus; a shaft gear 50 axially combined to a steering shaft 40 of a vehicle; a first detecting gear 52 joined in a tooth combining manner, with a predetermined gear ratio, to appropriate position of the shaft gear 50; a first permanent magnet 56 installed on an axis of the first detecting gear 52, for generating rotational magnetic field; a first magneto resistive sensor 20 closely installed on an upper portion of the first permanent magnet 56, for detecting rotational angle of the rotational magnetic field; a second detecting gear 58 joined in a tooth combining manner, with a predetermined gear ratio, to appropriate position of the shaft gear 50 on the same plane of the first detecting gear 52; a second permanent magnet 60 installed on an axis of the second detecting gear 58, for generating rotational magnetic field; a second magneto resistive sensor 30 closely installed on an upper portion of the second permanent magnet 60, for detecting rotational angle of the rotational magnetic field; a printed circuit board 70 on which other electrical circuits necessary for the detecting apparatus are mounted, for supporting the first and the second magneto resistive sensors 20 and 30; and a housing 80 within which the above parts are included.

In the foregoing construction, the shaft gear 50, the first detecting gear 52 and the second detecting gear 58 are all realized by a spur gear, and the number of teeth for the shaft gear is 42, the number of teeth for the first detecting gear 52 is 28, and the number of teeth for the second detecting gear 58 is 26. Therefore, a gear ratio between the shaft gear 50 and the first detecting gear 52 is 42/28, and a gear ratio between the shaft gear 50 and the second detecting gear 58 is 42/26. In the meantime, as the steering shaft 40, that is to say, the shaft gear 50 rotates, the permanent magnets 56 and 60 respectively installed on axes of the first detecting gear 52 and the second detecting gear 58, rotate together with the first and the second detecting gears 52 and 58, whereby directions of magnetic fields are changed. The first and the second magneto resistive sensors 20 and 30 output detecting signals in response to such changes, and computing/controlling unit (not shown) outputs steering angle and direction by processing the detected signals using a predetermined program.

But, according to the apparatus for detecting steering angle in vehicle of the related art, as the first and the second detecting gears are joined each other in a tooth combining manner on the same plane, a problem that the whole size for the detecting apparatus becomes large, is generated.

SUMMARY OF THE INVENTION

To solve the above-indicated problem, it is, therefore, an object of the present invention to provide an apparatus for detecting steering angle in vehicle such that the size of the apparatus for detecting steering angle in vehicle using gears and magneto resistive sensors, could be reduced.

The foregoing and other objects and advantages are realized by providing an apparatus for detecting steering angle in vehicle including: a shaft gear axially combined to a steering shaft of a vehicle; a first detecting gear joined, with a first gear ratio, to the shaft gear in a tooth combining manner; a second detecting gear joined, with a second gear ratio, to the shaft gear in a tooth combining manner; a first permanent magnet installed on an axis of the first detecting gear, for generating rotational magnetic field; a first magneto resistive sensor closely installed adjacent to an upper portion of the first permanent magnet, for detecting rotational angle of the rotational magnetic field; a second permanent magnet installed on an axis of the second detecting gear, for generating rotational magnetic field; a second magneto resistive sensor closely installed adjacent to an upper portion of the second permanent magnet, for detecting rotational angle of the rotational magnetic field; and a computing/controlling means for computing rotational direction and angle of the steering shaft by processing detected signals provided from the first and the second magneto resistive sensors using a predetermined program, the apparatus is configured such that: the shaft gear is a multi-level gear having an upper level gear and a lower level gear; the first and the second detecting gears are joined to the upper level gear and the lower level gear in a tooth combining manner, respectively, so that the first and the second detecting gears are partially overlapped; and a gap maintaining member for equally maintaining a gap between the second permanent magnet and the second magneto resistive sensor, and a gap between the first permanent magnet and the first magneto resistive sensor, is further included.

BRIEF DESCRIPTION OF THE DRAWINGS

The above objects, features and advantages of the present invention will become more apparent from the following detailed description when taken in conjunction with the accompanying drawings, in which:

FIG. 1 is a plan view schematically illustrating an apparatus for detecting steering angle in vehicle of the related art;

FIG. 2 is a cross-sectional view taken along line A—A in an apparatus for detecting steering angle in vehicle of the related art;

FIG. 3 is a drawing explaining detecting principle of a magneto resistive sensor used for an apparatus for detecting steering angle in vehicle according to an embodiment of the present invention;

FIG. 4 is a drawing illustrating detected waveform output of a magneto resistive sensor;

FIG. 5 is a perspective view schematically illustrating an apparatus for detecting steering angle in vehicle of the present invention;

FIG. 6 is a cross-sectional view schematically illustrating part of a housing of FIG. 5;

FIG. 7 is a graph illustrating relation between detected angles of the first and the second detecting gears, and rotational angle of the shaft gear in an apparatus for detecting steering angle in vehicle of the present invention; and FIG. 8 is a graph illustrating relation between detected angle difference of the first and the second detecting gears, and rotational angle of the shaft gear.

DETAILED DESCRIPTION OF THE PREFERRED EMBODIMENT

The following detailed description will present an apparatus for detecting steering angle in vehicle according to a preferred embodiment of the present invention in reference to the accompanying drawings. In the first place, detecting principle of the magneto resistive sensor will be described.

FIG. 3 is a drawing explaining detecting principle of the magneto resistive sensor used for an apparatus for detecting steering angle in vehicle according to an embodiment of the present invention, and FIG. 4 is a drawing illustrating detected waveform output of a magneto resistive sensor. As shown in FIG. 3, when external rotational magnetic field B is applied to the magneto resistive sensor 20 having two magneto resistive bridge elements 22 and 24 tilted as much as 45 degrees each other, two square wave signals VU1 and VU2 whose periods are 180 degrees and whose phase difference is 45 degrees as shown in FIG. 4, are obtained at output terminals U1 and U2 of the bridge elements 22 and 24. At the moment, if amplitudes of the square waves VU1 and VU2 are the same, then present angle θ of the external rotational magnetic filed B is possibly calculated by the following formula 1.

$$\theta = \frac{1}{2}\arctan(VU1/VU2) \quad \text{[Formula 1]}$$

For the foregoing magneto resistive sensor, anisotropic magneto resistive sensor made of Permalloy (registered trademark) thin film, a kind of alloy consisting of iron and nickel, is preferably used. In FIG. 3, reference numerals Vcc1 and Vcc2 stand for power supply voltages applied to the bridge elements 22 and 24, respectively, +Vo1 and −Vo1 stand for positive output voltage and negative output voltage of the bridge element 22, respectively, and +Vo2 and −Vo2 stand for positive output voltage and negative output voltage of the bridge element 24, respectively.

FIG. 5 is a perspective view schematically illustrating the apparatus for detecting steering angle in vehicle of the present invention and FIG. 6 is a cross-sectional view schematically illustrating part of a housing of FIG. 5.

As shown in FIG. 5 and FIG. 6, the mechanical construction of the apparatus for detecting steering angle in vehicle according to the present invention, includes: a housing 80' for receiving the apparatus; a shaft gear 50' inserted on the outer periphery of a steering shaft 40 of a vehicle, and has a construction of multi-level consisting of upper and lower levels; a first detecting gear 52' joined, with a predetermined gear ratio, in a tooth combining manner, to a gear 50u (referred to an upper level gear hereinafter) arranged on an upper level among the shaft gear 50'; a first permanent magnet 56 installed on an axis of the first detecting gear 52', for generating rotational magnetic field; a first magneto resistive sensor 20 closely installed adjacent to an upper portion of the first permanent magnet 56, for detecting rotational angle of the rotational magnetic field; a second detecting gear 58' joined, with a predetermined ratio, in a tooth combining manner, to a gear 50l (referred to a lower level gear hereinafter) arranged on a lower level of the shaft gear 50' with being partially overlapped with the first detecting gear 52' when seen from a plane; a second permanent magnet 60 installed on an axis of the second detecting gear 58', for generating rotational magnetic field; a second magneto resistive sensor 30 closely installed adjacent to an upper portion of the second permanent magnet 60, for detecting rotational angle of the rotational magnetic field; a printed circuit board 70' on which other electrical circuits necessary for the detecting apparatus are mounted, for supporting the first and the second magneto resistive sensors 20 and 30; and a housing 80' within which the above parts are included.

In the foregoing construction, the shaft gear 50', the first detecting gear 52' and the second detecting gear 58' are all realized by a spur gear. If the numbers of teeth for the upper level gear 50u and the lower level gear of the shaft gear 50', are 39 and 42, respectively, and the numbers of teeth for the first detecting gear 52' and the second detecting gear 58' are 26 and 26, respectively, then the ratio between the shaft gear 50 and the first detecting gear 52 and the ratio between the shaft gear 50 and the second detecting gear 58 in the related art, are maintained in the same way as before. Resultantly, the output values from the first magneto resistive sensor 20 and the second magneto resistive sensor 30 are the same as the values in case of the related art, but the first detecting gear 52' and the second detecting gear 58' are joined, in a tooth combining manner, to the upper level gear 50u and the lower level gear 50l, respectively, of the shaft gear 50' with being partially overlapped each other, so that a width of the housing 80' on which the first and the second detecting gears 52' and 58' are positioned, is possibly reduced. Namely, the whole size of the detecting apparatus could be reduced. In FIG. 6, the reference numeral 54 stands for a gap maintaining member for equally maintaining a gap between the second magneto resistive sensor 30 and the second permanent magnet 60, and a gap between the first magneto resistive sensor 20 and the first permanent magnet 56, even in case that the second detecting gear 58' is jointed to the lower level gear 50l of the shaft gear 50' in a tooth combining manner.

FIG. 7 is a graph illustrating relation between detected angles of the first and the second detecting gears, and rotational angle of the shaft gear in an apparatus for detecting steering angle in vehicle of the present invention. First of all, presume that rotational angle of the shaft gear 50' is Ψ, rotational angle of the first detecting gear 52' is θ, and rotational angle of the second detecting gear 58' is θ. The number(m) of teeth of the upper level gear 50u of the shaft gear 50' is 42, the number(m') of the lower level gear 50l of the shaft gear 50' is 39, and the numbers(n) of the first and the second detecting gears 52' and 58' are 26 and 26, respectively, so that relation between detected angels of the first and the second detecting gears 52' and 58', and rotational angle of the shaft gear 50' is represented by the graph as shown in FIG. 7, and these variables m, m' and n satisfy the following formulae.

$$\psi = \frac{m\theta}{n} = \frac{m'\theta'}{n} \quad \text{[Formula 2]}$$

The following formula 3 is derived from the above formula 2.

$$\Delta\theta = \theta - \theta' = \left(\frac{n}{m} - \frac{n}{m+1}\right)\psi = \frac{n\psi}{mm'} \quad \text{[Formula 3]}$$

Therefore, rotational angle of the shaft gear 50' is given by the following formula 4.

$$\psi = mm'\frac{\Delta\theta}{n} \quad \text{[Formula 4]}$$

In the foregoing formula 4, in case that θ>θ', ψ can be obtained with Δθ=θ−θ', and in case that θ<θ', ψ can be obtained with Δθ=θ−θ'+180°.

FIG. 8 is a graph illustrating relation between detected angle difference of the first and the second detecting gears, and rotational angle of the shaft gear. As shown in FIG. 8, relation between detected angle difference Δθ of the first and the second detecting gears 52' and 58', and rotational angle of the shaft gear 50', becomes linear. Therefore, analog detected values of the first and the second magnetic resistive sensors 20 and 30 are converted into digital data and directly input to the above formula 4, or input to conversion table for detected value difference Δθ versus rotational angle ψ of the shaft gear, whereby the steering angle and direction could be finally obtained.

While the invention has been shown and described with reference to certain preferred embodiments thereof, it will be understood by those skilled in the art that various changes in form and details may be made therein without departing from the spirit and scope of the invention as defined by the appended claims. For example, unlike the foregoing embodiment, the upper level gear 50u of the shaft gear 50' could be joined to the second detecting gear 58' in a tooth combining manner, and the lower level gear 50l of the shaft gear 50' could be joined to the first detecting gear 52' in a tooth combining manner. In that case, the number of teeth thereof may be appropriately changed.

As is apparent from the foregoing, according to the apparatus for detecting steering angle in vehicle of the present invention, the first and the second detecting gears are configured such that these detecting gears are partially overlapped each other with the shaft gear arranged in multi-level, whereby the size of the apparatus could be effectively reduced.

What is claimed is:

1. An apparatus for detecting steering angle in a vehicle, the apparatus comprising:

a shaft gear axially combined to a steering shaft of a vehicle;

a first detecting gear joined, with a first gear ratio, to the shaft gear in a tooth combining manner;

a second detecting gear joined, with a second gear ratio, to the shaft gear in a tooth combining manner;

a first permanent magnet installed on an axis of the first detecting gear, for generating rotational magnetic field;

a first magneto resistive sensor closely installed adjacent to an upper portion of the first permanent magnet, for detecting rotational angle of the rotational magnetic field;

a second permanent magnet installed on an axis of the second detecting gear, for generating rotational magnetic field;

a second magneto resistive sensor closely installed adjacent to an upper portion of the second permanent magnet, for detecting rotational angle of the rotational magnetic field; and a controlling device which computes rotational direction and angle of the steering shaft by processing detected signals provided from the first and the second magneto resistive sensors using a predetermined program, wherein the shaft gear is a multi-level gear having an upper level gear and a lower level gear; and the first and the second detecting gears are joined to the upper level gear and the lower level gear in a tooth combining manner so that the first and the second detecting gears are partially overlapped.

2. The apparatus according to claim 1, further comprising a gap maintaining member for equally maintaining a gap between the second permanent magnet and the second magneto resistive sensor, and a gap between the first permanent magnet and the first magneto resistive sensor.

* * * * *